United States Patent
Ghanadiof

(10) Patent No.: US 11,477,631 B2
(45) Date of Patent: Oct. 18, 2022

(54) EARTHQUAKE DAMAGE WARNING SYSTEM

(71) Applicant: Omidreza Ghanadiof, Los Angeles, CA (US)

(72) Inventor: Omidreza Ghanadiof, Los Angeles, CA (US)

(*) Notice: Subject to any disclaimer, the term of this patent is extended or adjusted under 35 U.S.C. 154(b) by 0 days.

(21) Appl. No.: 17/202,494

(22) Filed: Mar. 16, 2021

(65) Prior Publication Data
US 2022/0303747 A1    Sep. 22, 2022

(51) Int. Cl.
*H04W 4/90* (2018.01)
*H04W 4/38* (2018.01)
*G08B 5/22* (2006.01)
*H04W 4/14* (2009.01)
*G01V 1/00* (2006.01)
*H04L 51/42* (2022.01)

(52) U.S. Cl.
CPC .............. *H04W 4/90* (2018.02); *G01V 1/008* (2013.01); *G08B 5/22* (2013.01); *H04W 4/38* (2018.02); *H04L 51/42* (2022.05); *H04W 4/14* (2013.01)

(58) Field of Classification Search
CPC ........... H04W 4/90; H04W 4/38; H04W 4/14; G08B 5/22
See application file for complete search history.

(56) References Cited

U.S. PATENT DOCUMENTS

| | | | | |
|---|---|---|---|---|
| 5,065,552 A | | 11/1991 | Kobori | |
| 5,817,944 A | * | 10/1998 | Chung | G01L 1/20 73/768 |
| 5,948,984 A | * | 9/1999 | Hedberg | G01M 5/0033 73/801 |
| 6,553,336 B1 | * | 4/2003 | Johnson | G05B 19/0421 702/182 |
| 8,410,952 B2 | * | 4/2013 | Abercrombie | G01M 5/0066 340/870.06 |
| 9,523,781 B2 | * | 12/2016 | Aarre | G01V 1/301 |

(Continued)

FOREIGN PATENT DOCUMENTS

| KR | 101765108 | 8/2017 |
|---|---|---|
| WO | 2002/022994 | 3/2002 |

(Continued)

*Primary Examiner* — Hoi C Lau
(74) *Attorney, Agent, or Firm* — Makoui Law, PC; Ali Makoui

(57) ABSTRACT

A system and method for providing earthquake damage and collapse warning by a warning device is disclosed. The warning device is communicatively connected to a one or more client devices using a communications network. The warning device includes an input sensor for generating signals of crack formation within a structure, a message generator and transmitter for sending an warning message, a memory having instructions stored thereon; and a processor configured to execute the instructions on the memory to cause the waring device to receive an input signal from the input sensor, characterize the input signal using its amplitude, duration, location and direction, and frequency, identify the input signal as being a result of an earthquake, generate a warning message identifying detection of an event, and transmit the warning message to the one or more client devices over the communications network.

24 Claims, 4 Drawing Sheets

(56) References Cited

U.S. PATENT DOCUMENTS

| | | | |
|---|---|---|---|
| 9,641,621 B2* | 5/2017 | Lovitt | H04L 67/12 |
| 9,832,595 B2* | 11/2017 | Lovitt | H04L 67/12 |
| 10,533,858 B2* | 1/2020 | Anders | G01J 5/0025 |
| 10,572,900 B2* | 2/2020 | Brown | G06Q 30/0261 |
| 10,604,199 B1* | 3/2020 | Swacil | B60R 16/02 |
| 10,671,767 B2 | 6/2020 | Duff | |
| 10,768,027 B2* | 9/2020 | Dowdall | G01J 1/4204 |
| 11,047,690 B2* | 6/2021 | Anders | G01S 13/86 |
| 11,105,735 B1* | 8/2021 | Gray | G01N 21/31 |
| 11,181,445 B2* | 11/2021 | Lochry | G01M 99/004 |
| 2002/0184917 A1* | 12/2002 | Cadet | C03B 19/12 |
| | | | 65/17.2 |
| 2003/0174924 A1* | 9/2003 | Tennyson | G01D 5/35383 |
| | | | 374/E11.015 |
| 2010/0279647 A1* | 11/2010 | Jacobs | H04B 7/15507 |
| | | | 455/404.1 |
| 2012/0033851 A1* | 2/2012 | Chen | G06T 7/0002 |
| | | | 382/100 |
| 2012/0146802 A1* | 6/2012 | Abercrombie | G01M 5/0066 |
| | | | 340/669 |
| 2012/0164953 A1* | 6/2012 | Gu | G01S 5/0252 |
| | | | 455/67.11 |
| 2012/0319893 A1* | 12/2012 | Yun | G01S 13/9023 |
| | | | 342/25 C |
| 2013/0110462 A1* | 5/2013 | Lovitt | H04W 4/70 |
| | | | 702/179 |
| 2013/0216089 A1* | 8/2013 | Chen | G06T 7/0002 |
| | | | 382/100 |
| 2014/0188392 A1* | 7/2014 | Aarre | G01V 1/301 |
| | | | 702/14 |
| 2015/0051976 A1* | 2/2015 | Brown | G06Q 30/0267 |
| | | | 705/14.58 |
| 2015/0316373 A1* | 11/2015 | Boudin | G01C 9/22 |
| | | | 356/482 |
| 2017/0160111 A1* | 6/2017 | Dowdall | G01J 1/4204 |
| 2017/0208421 A1* | 7/2017 | Lovitt | H04W 4/70 |
| 2017/0307467 A1* | 10/2017 | Mccallen | G01M 7/02 |
| 2018/0136085 A1* | 5/2018 | Lochry | G01M 5/0091 |
| 2018/0239948 A1* | 8/2018 | Rutschman | G06V 10/40 |
| 2018/0274954 A1* | 9/2018 | Pacini | G01D 5/35364 |
| 2018/0302149 A1* | 10/2018 | Park | H01Q 21/26 |
| 2019/0137279 A1* | 5/2019 | Anders | G05D 1/0027 |
| 2019/0323865 A1* | 10/2019 | Dowdall | E04B 1/16 |
| 2020/0003918 A1* | 1/2020 | Vancho | G08B 21/10 |
| 2020/0072614 A1* | 3/2020 | Anders | G05D 1/0088 |
| 2021/0183218 A1* | 6/2021 | Johnson | G08B 25/14 |

FOREIGN PATENT DOCUMENTS

| | | |
|---|---|---|
| WO | 2002022994 | 3/2002 |
| WO | 2012/131738 | 4/2012 |
| WO | 2012131738 | 10/2012 |
| WO | 2017/019980 | 2/2017 |
| WO | 2017019980 | 2/2017 |

* cited by examiner

EARTHQUAKE DAMAGE WARNING SYSTEM

TECHNICAL FIELD

This application relates in general to a system and method for providing disaster warning, and more specifically, to a system and method for providing earthquake damage and collapse warning.

BACKGROUND

When an earthquake happens, until aftershock comes might be delay sometimes takes a week. Keeping safety and damage is the first priority of this type of disaster. Technically, as soon as the building starts shaking again, cracks might appear within a brick wall, and the wall or entire building might collapse even during shaking or shortly after any following aftershocks to come.

Therefore, a need exists for a device to simply recognize the new crack in the wall immediately and notify the owner/tenant of the building by sending a notification in the app to be evacuated until an expert verifying damage and risk of collapse. The present invention attempts to address the limitations and deficiencies within prior solutions according to the priniciples and example embodiments disclosed herein.

SUMMARY

In accordance with the present invention, the above and other problems are solved by providing a system and method for providing earthquake damage and collapse warning as disclosed herein.

In one embodiment, the present invention is a system for providing earthquake damage and collapse warning by a warning device. The warning device is communicatively connected to a one or more client devices using a communications network. The warning device includes an input sensor for generating signals of crack formation within a structure, a message generator and transmitter for sending an warning message, a memory having instructions stored thereon; and a processor configured to execute the instructions on the memory to cause the waring device to receive an input signal from the input sensor, characterize the input signal using its amplitude, duration, location and direction, and frequency, identify the input signal as being a result of an earthquake, generate a warning message identifying detection of an event, and transmit the warning message to the one or more client devices over the communications network.

In another aspect of the present disclosure, the communications network is a cellular phone network.

In another aspect of the present disclosure, the communications network is a wireless data network connected to the Internet.

In another aspect of the present disclosure, the warning message is transmitted as an email message.

In another aspect of the present disclosure, the warning message is transmitted is transmitted as an SMS text message.

In another aspect of the present disclosure, the input sensor comprises one or more sensor devices from the following devices: an ultrasonic sensor, a lidar sensor, an infrared sensor, a radar sensor, a proximity sensor and an optical sensors.

In another embodiment, the present invention is a method for providing earthquake damage and collapse warning by a warning device. The warning device is communicatively connected to a one or more client devices using a communications network. The warning device includes an input sensor for generating signals of crack formation within a structure, a message generator and transmitter for sending an warning message, the method receives an input signal from the input sensor, characterizes the input signal using its amplitude, duration, location and direction, and frequency, identifies the input signal as being a result of an earthquake, generates a warning message identifying detection of an event, and transmits the warning message to the one or more client devices over the communications network.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
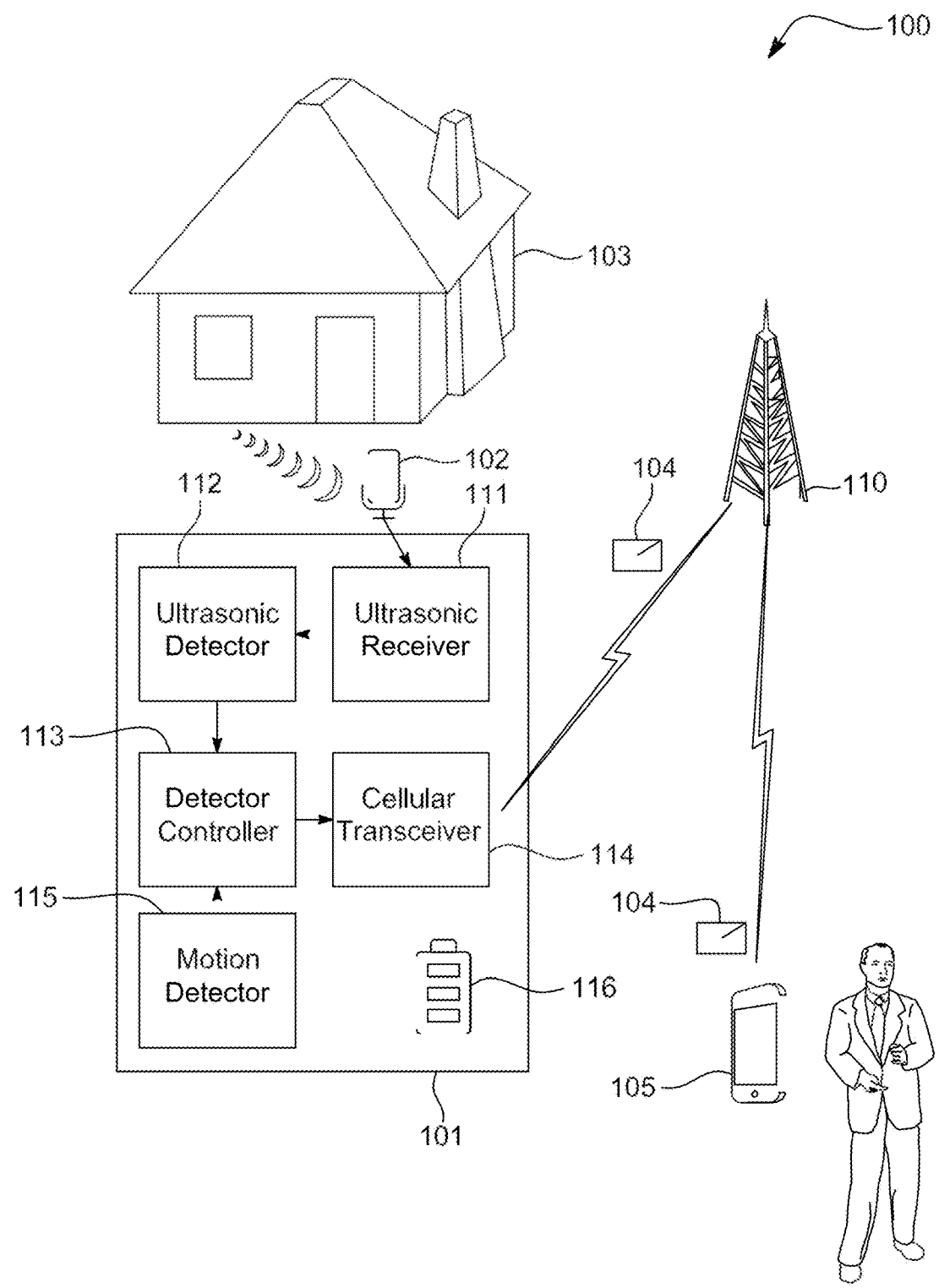
FIG. 1 illustrate an examples embodiment for a system that provides earthquake damage and collapse warning according to the present invention.

This application relates in general a system and method for providing disaster warnings, and more specifically, to a system and method earthquake damage and collapse warning according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a media player, set-top box, smartphone, tablet, and/or web browser on any computing device.

The term "connection" refers to connecting any component as defined below by any means, including but not limited to, a wired connection(s) using any type of wire or cable for example, including but not limited to, coaxial cable(s), fiberoptic cable(s), ethernet cable(s) or wireless connection(s) using any type of frequency/frequencies or radio wave(s). Some examples are including below in this application.

The term "invention" or "present invention" refers to the invention being applied for via the patent application with the title "Earthquake Damage Warning System." Invention may be used interchangeably with earthquake warning detector.

The terms "communicate," or "communication" refer to any component(s) connecting with any other component(s) in any combination for the purpose of the connected components to communicate and/or transfer data to and from any components and/or control any settings.

In general, the present disclosure relates a system and method for providing additional sensory stimulation related to multimedia data playback. To better understand the present invention, FIG. 1 illustrate an examples embodiment for a system that provides earthquake damage and collapse warning according to the present invention. An earthquake warning detector system 100 is utilized to detect an occurrence of an earthquake and subsequent building damage that poses a risk of injury to occupants and possible collapse of a building 103. An earthquake detector damage device 101 placed within any building 103 having an ultrasonic sensor 102 to listen for damage occurring to or within the building 103. When the earthquake damage detector device 101 detects possible damage, a warning message 104 is transmitted to a responsible party, such as a property owner or maintenance worker, to take necessary steps to evacuate the building 103. Emergency authorities may also be copied on the warning message 104 to provide warnings to them as well.

The warning message 104 may be sent as an email, SMS text message, or similar waring message sent to a mobile application on a mobile device mobile device 105 of the responsible parties. The warning message 104 may be sent over a wireless network 110 such as a 3G, 4G LTE, or 5G cellular network to the mobile device 105. The warning message 104 may also be sent via Wifi for communications to a local network device connected to the Internet (not shown). The warning message 104 may include a date and time of the detected event, a description of the detected event, a location of the building 103, an estimated severity of the detected event, identities of all responsible parties notified, identities of any special needs individuals within the building 103, and any other relevant information regarding the building 103, its contents, and its occupants.

The earthquake damage detector device 101 comprises an ultrasonic receiver 111, an ultrasonic detector 112, a detector controller 113, a wireless network transceiver 114, and a motion detector 115. The ultrasonic receiver 111 detects shifts and cracks that form within a building. These sensors that are already installed functionally detect gaps or cracks or dent in the foundation, wall, column and send notification. Technically, the main job of these sensors is to recognize any change on the surface and notify the owner to evacuate the building, bridge before aftershock comes and collapse happens. The sensors may also include other sensing technology such as lidar, Infrared, radar sensor, proximity sensor and optical sensors.

These sensors can combine with shock detection sensor together. In fact, shock detector and ultrasonic can come together, so ultrasonic will be in sleep mode always, once earthquake happen shock detection command ultrasonic to start monitoring. Then if any changes happen in surface ultrasonic or other types of sensor that mentioned earlier send notification to the owner's phone.

The ultrasonic detector 112 receives the input signals from the ultrasonic receiver 111 and processes them to detect an event requiring notification to the responsible parties. The detector 112 is searching for significant changes in the building, walls, foundation, and similar surfaces and structures that change when subjected to an earthquake. The changes in the received signals may be detected.

The detector controller 113 is a programmable control device within the earthquake damage detector device 101 that receives detection notifications from the ultrasonic detector 112 and motion detection notifications from the motion detector 115 and responds to these events. The detector controller 113 may analyze the notification and detected signals to categorize and classify any detected events in order to take appropriate action. The detector controller 113 generates the warning message 104 and transmits them to the mobile device 105 of responsible parties over the wireless network 110 via the wireless network transceiver 114. The detector controller constructs the warning message 104 and includes all relevant information that may be useful to recipients of the warning message 104. Depending upon the categorization and classification of the detected event, the warning message 104 and its recipients may be different.

The wireless network transceiver 114 receives the warning message 104 from the detector controller 113 and generates the radio signals to communicate with the wireless network 110 to send the warning message 104 to the mobile devices 105. The wireless network transceiver 114 generates the signals in the signal format and protocol needed to communicate with the particular wireless network 110 in use.

The motion detector 115 may include a accelerometer or mercury-switch based motion detector to provide earthquake event confirmation to the detector controller 113 in addition to any audio or ultrasonic event detected by the ultrasonic detector 102 and passed to the ultrasonic receiver 111.

The earthquake damage detector device 101 may be installed within any wall or structure within the building 103 to detect an earthquake event. The earthquake damage detector device 101 may be placed near particular equipment that may present a danger if damages, such as a boiler or similar device. The earthquake damage detector device 101 may also be placed within an exterior wall to detect damage to brickwork or other external building fixtures that may suffer damage and/or present a particular danger to individuals when damaged. The earthquake damage detector device 101 may be powered by building electrical power while having a rechargeable backup battery 116 to provide operating power for a period of time should the building 103 lose power during such an event.

Figure 2:
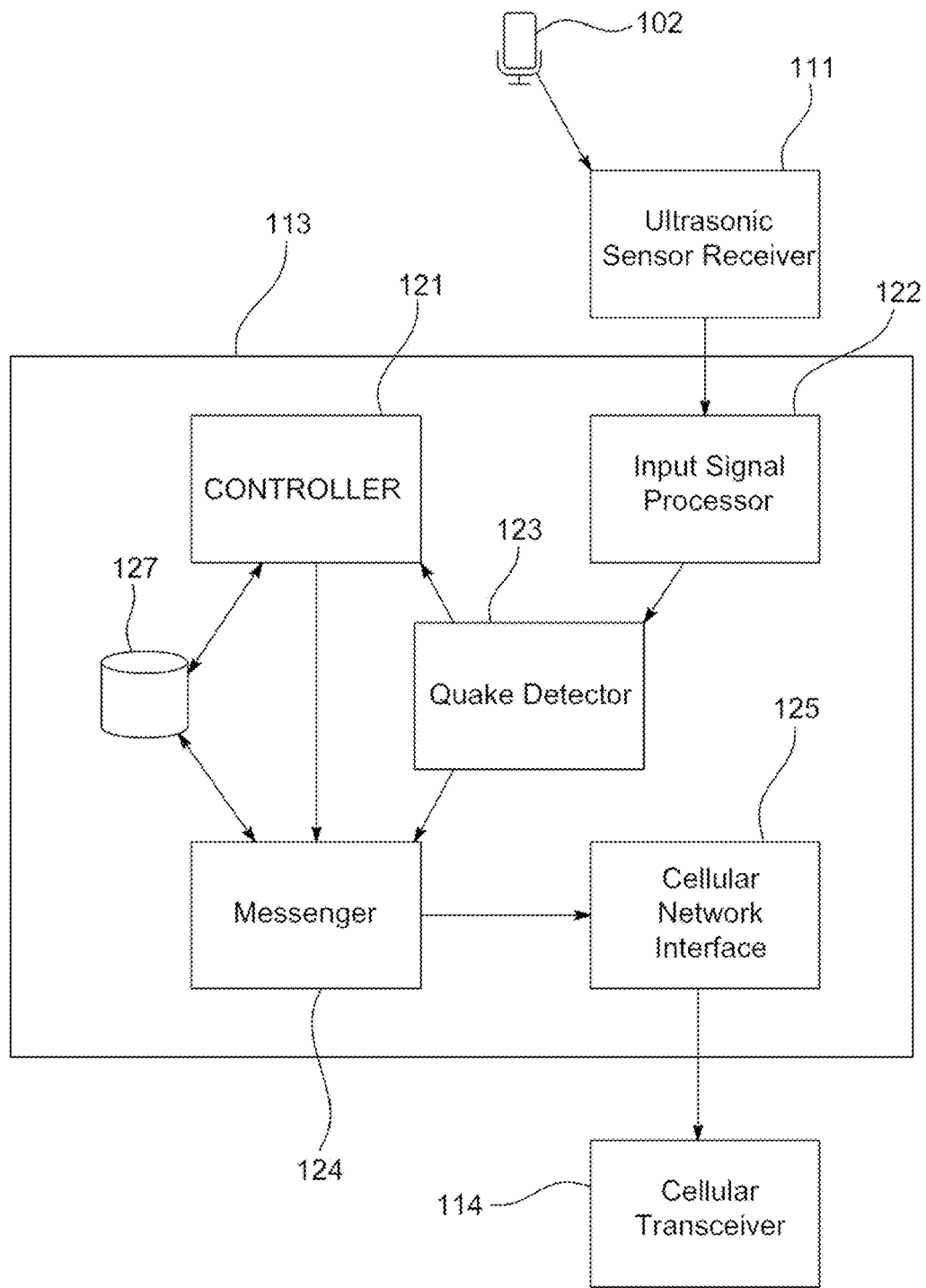
FIG. 2 illustrates a computing system of software components for providing olfactory sensory stimulation according to the present invention.

FIG. 2 illustrates a computing system of software components for providing olfactory sensory stimulation according to the present invention. The detector controller 113 is a sequencer and control device that receives input signals from sensors and generates warning message 104 for transmission over the wireless network 110. In a preferred embodiment, the detector controller 113 may be constructed using a set of software passed components executing on a programmable device. Of course, the earthquake damage detector device 101 may also be constructed with equivalent control and sequencing devices, including combinatorial logic, a state machine, a micro-coded device and equivalent electronic structures to perform the functions of the detector controller 113.

In the preferred embodiment, the detector controller 113 includes a set of software components including a controller 121, an audio processor 122, a quake detector 123, a messenger 124, and a network interface 125. The detector controller 113 may also include local data storage 127 for use by the software components as necessary.

The controller 121 performs all control and monitoring functions within the set of software components of the detector controller 113. The controller 121 receives and forwards signals and event detection signals between the software components to identify, classify and categorize any recognized events. The controller 121 sends the relevant information to the messenger 124 to generate a warning message 104 for transmission. The controller 121 may also monitor the health and operation of the various components, including the ultrasonic receiver 111, wireless network transceiver 114, motion detector 115, and rechargeable battery 116 and related power systems. The controller 121 may instruct the messenger 124 to transmit messages to mobile device 105 regarding device status, maintenance, and repair needs as appropriate.

The audio processor 122 listens for sounds of cracks forming in the walls and foundations. Sound of known environmental sources including traffic, weather, and the like may be identifies from its characteristics of intensity and amplitude, frequency, duration and relations to other recognized sounds to detect and eliminate known occurrences from the detected signals that may be trusted to not be the result of an earthquake. The audio processor 122 identifies these sounds and indicates their identity for used by the quake detector 123 to eliminate potential false occurrences.

The quake detector 123 receives processed audio and sensors signals to identify the shifting of the structure many be detected from these auditory signals from the received input signals. The amplitude of the sounds is detected and then the frequency, duration, and spatial location of the signals may be used to identify the creation of the damage to the building.

The messenger 124 receives message commands from the controller 121 and generates a warning message 104 for transmission by the network interface 125. The messenger 124 obtains all needed information for inclusion within the warning message 104 and formats the message for its intended recipients. The same message command may cause the messenger 124 to generate multiple related warning messages 104 containing the information relevant to the specific recipient. For example, a warning message 104 to fire or other emergency authorities may be different than once sent to a property owner or maintenance personnel. Each warning message 104 generated may be transmitted by the network interface 125 to recipients' mobile device 105 via the wireless network 110.

The network interface 125 permits the controller 121 to communicate with mobile device 105 using the wireless network 110. The network interface 125 performs all of the data formatting, computer to computer communications, encryption processing, and all similar operations needed by controller 121 to communicate with responsible parties.

Figure 3:
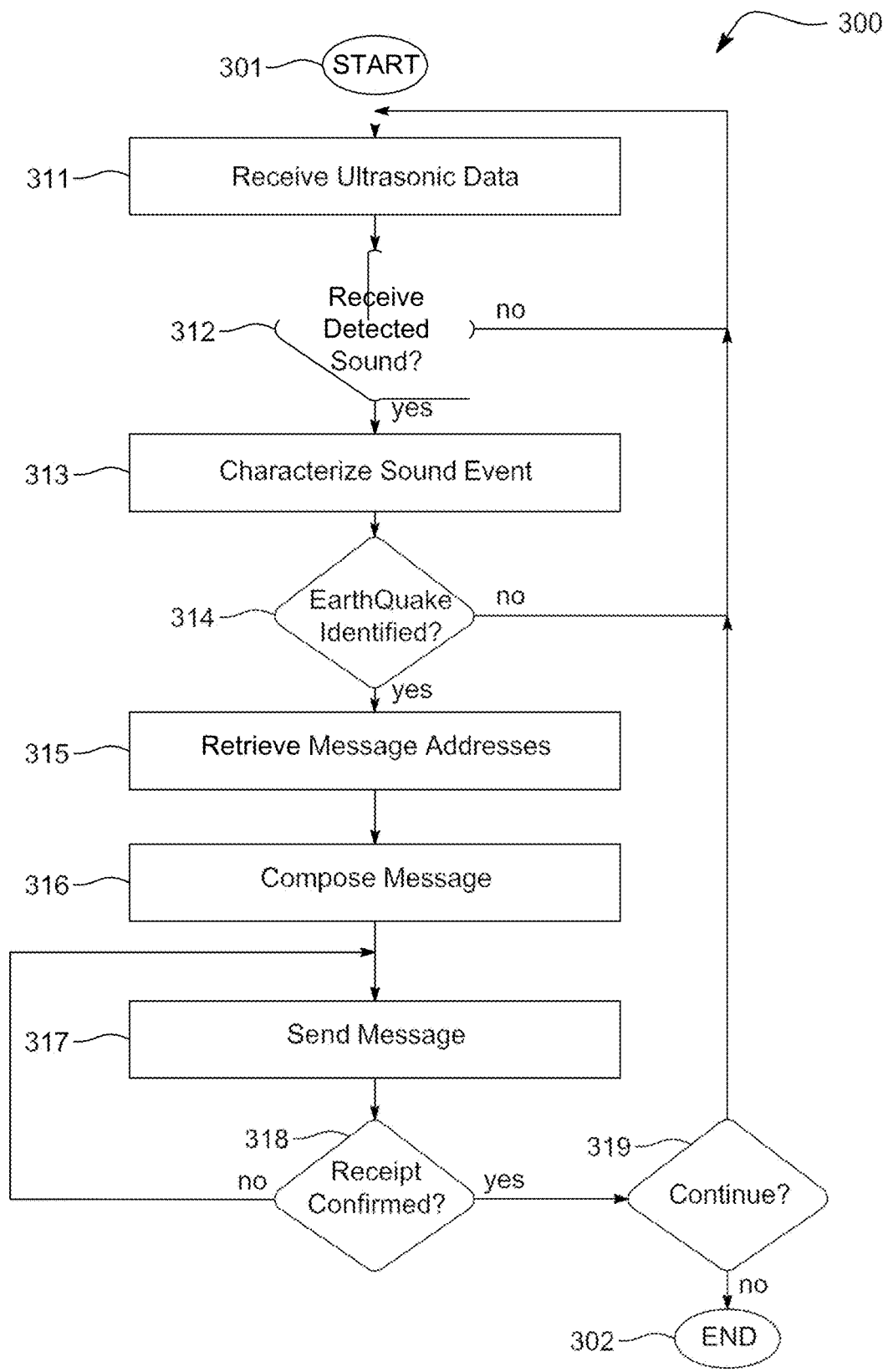
FIG. 3 illustrates a method and algorithm for earthquake damage and collapse warning from a device according to an embodiment of the present disclosure.

FIG. 3 illustrates a method and algorithm for earthquake damage and collapse warning from a device according to an embodiment of the present disclosure. The process 300 begins 301 when an ultrasonic data signal is received by the detector controller 113 in step 311. Test step 312 determines whether the ultrasonic data is recognized as an identified event, and if not, the process 300 returns to step 311 to continue to monitor the input data signals. Test step 312 attempts to filter out random noise and background sounds that are not signals representing recognizable events.

When test step 312 causes the detector controller 113 to detect a recognizable signal, the process continues to step 313 in which the detector controller 113 characterizes the ultrasonic event. In test step 314, the detector controller 113 determines whether the recognizable signal is the result of an earthquake or similar event requiring a warning message 104 to be generated. If not, the process 300 returns to step 311 to continue to monitor the environment. When test step 314 determines that a warning message 104 is required, the messenger 124 retrieves all message recipient addresses for the warning message 104 in step 315. The messenger 124 composes one or more relevant warning messages 104 for the recipients in step 316 before the warning message 104 are transmitted in step 317.

Test step 318 determines whether the messenger 124 has received confirmation that the warning message 104 has been received by the recipients, and if not, the process 300 returns to step 317 to ensure the warning message 104 are received. Step 317 may wait a defined period of time before a copy of the warning message 104 is retransmitted when confirmation of receipt has not been received. When test step 318 determines that all recipients have received the warning message 104 sent to them, the process 300 continues to test step 319 to determine whether the detector controller 113 is to continue monitoring the input signals, and if so, the process returns to step 311, otherwise the process ends 302.

Figure 4:
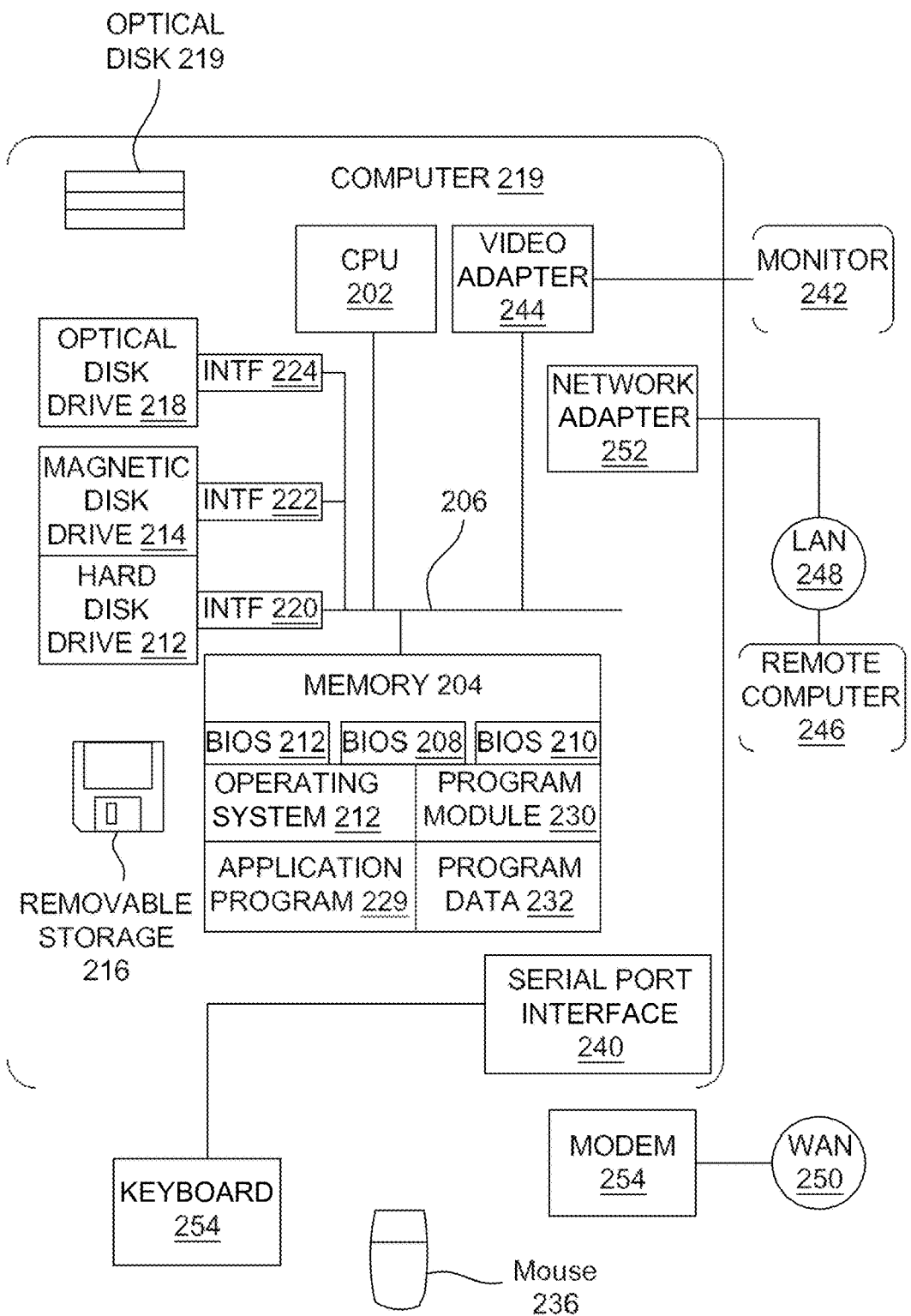
FIG. 4 illustrates a generalized schematic of a programmable processing system utilized as the various computing components described herein used to implement an embodiment of the present invention.

FIG. 4 illustrates a generalized schematic of a programmable processing system utilized as the various computing components described herein used to implement an embodiment of the present invention. The earthquake detector 100 may be implemented as a digital processing system 200 that contains software in the form of executable instructions stored within memory of the tire system controller 112. When the CPU 202 executes these instructions in memory, the tire system controller 112 performs the functions of the system 100 as described herein.

The CPU 202 is coupled to the system bus 204. The CPU 202 may be a general-purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. The communications adapter 214 may also be adapted to couple the computer system 200 to other networks such as a global positioning system (GPS) or a Bluetooth network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and or gyroscope may be coupled to the user interface adapter 216. The display adapter 222 may be driven by the CPU 202 to control the display on the display device 224. Any of the devices 202-222 may be physical and/or logical.

The applications of the present disclosure are not limited to the architecture of computer system 200. Rather the computer system 200 is provided as an example of one type of computing device that may be adapted to perform the functions of a parking management system, including servers, personal computers, and mobile devices as shown in FIG. 3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. An earthquake damage and collapse warning device, the earthquake damage and collapse warning device communicatively connected to one or more client devices using a communications network, the earthquake damage and collapse warning device comprising:
   an ultrasonic sensor for generating signals of crack formation within a structure;
   a transceiver for sending a warning message;
   a memory having instructions stored thereon; and
   a processor configured to execute the instructions on the memory to cause the earthquake damage and collapse warning device to:
      receive ultrasonic data from the ultrasonic sensor;
      characterize the ultrasonic data using the ultrasonic data amplitude, duration, location, direction, and frequency;
      identify the ultrasonic data as being a result of an earthquake;
      generate a warning message identifying detection of an event; and
      transmit the warning message to the one or more client devices from the transceiver over the communications network.

2. The earthquake damage and collapse warning device according to claim 1, wherein the communications network is a cellular phone network.

3. The earthquake damage and collapse warning device according to claim 1, wherein the communications network is a wireless data network connected to the Internet.

4. The earthquake damage and collapse warning device according to claim 1, wherein the warning message is transmitted as an email message.

5. The earthquake damage and collapse warning device according to claim 1, wherein the warning message is transmitted as an SMS text message.

6. The earthquake damage and collapse warning device according to claim 1, further comprising one or more of a lidar sensor, an infrared sensor, a radar sensor, a proximity sensor, and an optical sensor.

7. A method for providing earthquake damage and collapse warning by an earthquake damage and collapse waring device, the method comprising:
   receiving ultrasonic data from an ultrasonic sensor of the earthquake damage and collapse warning device, the ultrasonic data comprising signals of crack formation within a structure;
   characterizing the ultrasonic data using ultrasonic data amplitude, duration, location, direction, and frequency;
   identifying the ultrasonic data as being a result of an earthquake;
   generating a warning message identifying detection of an event; and
   transmitting the warning message through a transceiver of the earthquake damage and collapse warning device to one or more client devices over a communications network.

8. The method according to claim 7, wherein the communications network is a cellular phone network.

9. The method according to claim 7, wherein the communications network is a wireless data network connected to the Internet.

10. The method according to claim 7, wherein the warning message is transmitted as an email message.

11. The method according to claim 7, wherein the warning message is transmitted is transmitted as an SMS text message.

12. The method according to claim 7, wherein the input sensor comprises one or more of a lidar sensor, an infrared sensor, a radar sensor, a proximity sensor, and an optical sensor.

13. The method according to claim 7, wherein identifying the ultrasonic data as being a result of an earthquake comprises identifying sounds of cracks forming in walls and foundation of the structure as the result of the earthquake.

14. The method according to claim 7, wherein prior to receiving the ultrasonic data from the ultrasonic sensor, the ultrasonic sensor is in a sleep mode, the method further comprising:
   detecting an occurrence of an earthquake by a shock detection sensor of the earthquake damage and collapse warning device; and
   in response to the detection of the earthquake, sending a command from the shock detection sensor to the ultrasonic sensor to activate the ultrasonic sensor.

15. The method according to claim 7, wherein prior to receiving the ultrasonic data from the ultrasonic sensor, the ultrasonic sensor is in a sleep mode, the method further comprising:
   receiving motion detection identifications from a motion detector of the earthquake damage and collapse warning device; and
   determining that an earthquake has occurred based on the motion detection identifications.

16. The method according to claim 7, wherein the warning message comprises a date and time of the detected event, a description of the detected event, a location of a building where the earthquake damage and collapse warning device is located, and an estimated severity of the detected event.

17. The method according to claim 7, wherein the warning message comprises identities of any special needs individuals within a building where the earthquake damage and collapse warning device is located.

18. The method according to claim 7 further comprising:
   identifying random noise and background sounds from the corresponding characteristics of intensity, amplitude, frequency, duration, and relationships to recognized sounds; and
   filtering out the random noise and background sounds from the ultrasonic data prior to characterizing the ultrasonic data.

19. The earthquake damage and collapse warning device according to claim 1, wherein identifying the ultrasonic data as being a result of an earthquake comprises identifying sounds of cracks forming in walls and foundation of the structure as the result of the earthquake.

20. The earthquake damage and collapse warning device according to claim 1, wherein prior to receiving the ultrasonic data from the ultrasonic sensor, the ultrasonic sensor is in a sleep mode, the earthquake damage and collapse warning device further comprising a shock detection sensor, wherein the shock detection sensor is configured to:

detect an occurrence of an earthquake; and in response to the detection of the earthquake, send a command to the ultrasonic sensor to activate the ultrasonic sensor.

21. The earthquake damage and collapse warning device according to claim 1, the earthquake damage and collapse warning device further comprising a motion detector, the motion detector comprising one of an accelerometer and a mercury-switch, the motion detector configured to:

identify an earthquake event; and in response to identifying the earthquake event, provide an earthquake event confirmation to the processor of the earthquake damage and collapse warning device.

22. The earthquake damage and collapse warning device according to claim 1, wherein the warning message comprises a date and time of the detected event, a description of the detected event, a location of a building where the earthquake damage and collapse warning device is located, and an estimated severity of the detected event.

23. The earthquake damage and collapse warning device according to claim 1, wherein the warning message comprises identities of any special needs individuals within a building where the earthquake damage and collapse warning device is located.

24. The earthquake damage and collapse warning device according to claim 1, wherein the processor is further configured to cause the earthquake damage and collapse warning device to:

identify random noise and background sounds from the corresponding characteristics of intensity, amplitude, frequency, duration, and relationships to recognized sounds; and filter out the random noise and background sounds from the ultrasonic data prior to characterizing the ultrasonic data.

* * * * *